US006700976B2

(12) United States Patent
Zhang et al.

(10) Patent No.: US 6,700,976 B2
(45) Date of Patent: Mar. 2, 2004

(54) NOISE CANCELER SYSTEM WITH ADAPTIVE CROSS-TALK FILTERS

(75) Inventors: Ming Zhang, Singapore (SG); Hui Lan, Singapore (SG)

(73) Assignee: Nanyang Technological University (SG)

( * ) Notice: Subject to any disclaimer, the term of this patent is extended or adjusted under 35 U.S.C. 154(b) by 474 days.

(21) Appl. No.: 09/848,943

(22) Filed: May 3, 2001

(65) Prior Publication Data

US 2001/0048740 A1 Dec. 6, 2001

(51) Int. Cl.[7] .................................................. H04M 9/08

(52) U.S. Cl. .................. 379/406.01; 379/379; 379/388; 379/389; 379/391; 379/410; 379/411

(58) Field of Search ........................ 379/406.01, 406.05, 379/406.08, 406.09, 406.12, 392.01, 410, 388, 390, 420; 381/71.1, 94.1, 94.7; 370/286, 289, 290, 291

(56) References Cited

U.S. PATENT DOCUMENTS

| | | | | |
|---|---|---|---|---|
| 2002/0048377 A1 * | 4/2002 | Vaudrey et al. | ............ | 381/94.7 |
| 2003/0016815 A1 * | 1/2003 | Kurtz et al. | ........... | 379/406.01 |
| 2003/0039353 A1 * | 2/2003 | Matsuo | .................. | 379/406.01 |
| 2003/0144834 A1 * | 7/2003 | Macho et al. | ............... | 704/205 |

OTHER PUBLICATIONS

Widrow et al., "Adaptive Noise Cancelling: Principles and Applications," Proceedings of the IEEE, vol. 63 (No. 12), p. 1692–1719, (Jul. 12, 1975).

Zinser et al., "Some Experimental and Theoretical Results Using a New Adaptive Filter Structure for Noise Cancellation in the Presence of Crosstalk," p. 1253–1256, (Jul. 25, 1985).

Michandani et al., "Performance Characteristics of a Hardware Implementation of the Cross–Talk Resistant Adaptive Noise Canceller," p. 93–97, (Jul. 25, 1986).

* cited by examiner

*Primary Examiner*—Binh Tieu
*Assistant Examiner*—Tuan Pham
(74) *Attorney, Agent, or Firm*—Rutan & Tucker

(57) ABSTRACT

A known cross-talk adaptive noise cancellation apparatus uses two adaptive filters for suppressing the correlated noise in the main signal, which contains wanted voice and unwanted noise, by a reference signal, which contains unwanted noise and wanted voice via cross-talking. A noise canceler is provided in the present invention including some additional parts, such as a voice detection circuitry and a step size decision circuitry. The voice detection circuitry detects whether the wanted voice exists. The step size decision circuitry decides what the step sizes are used for the next update of the two adaptive filters.

12 Claims, 4 Drawing Sheets

NOISE CANCELER SYSTEM WITH ADAPTIVE CROSS-TALK FILTERS

BACKGROUND AND PRIOR ART

This invention relates to a system for noise suppression, particularly a noise canceler capable of cancelling background noise in a voice signal that is intermingled with noise, an accompanying method and a transceiver.

In many cases, noise corrupts a voice (speech) signal and hence the quality of recognition of the voice signal significantly. An example for such noise is background noise intermingled with the voice signal acquired by a microphone, a hand-free phone, a handset or the like.

It is important to recognize voice in a noisy environment, e.g. a construction site, a sport club, a Karaoke room, a hands-free communication system in a vehicle, especially a car, a helicopter, a tank or the like. Furthermore, noise suppression is useful in a live reporting system, a public addressing system or the like.

The recognition of voice can be done by an automatic voice recognition system or by at least one human listener.

The undesirable background noise can be of different sources. For example, making telephone calls out of a driving car, the driving noise, especially the noise of the engine, is a dynamically varying kind of noise that results in poor recognition of the voice, particularly in a hands-free speaking environment of the car. The addressee permanently hears a contaminated acoustic signal, in which the voice of the driver is included but difficult to understand. As a consequence, the driver has to speak up or take the handset of the telephone, which binds his attention to the handset and not the traffic—a very undesirable effect.

Moreover, there are lots of sites which need better recognition of voice and/or better understanding because of a noisy background. Some sites, additional to the above mentioned scenarios, are: airplanes, helicopters, airports, trains, buses, train stations, bus stops, construction sites, highways, streets or the like.

In [1] a concept and basic approach for adaptive noise cancellation are given. It can be used to eliminate background noise and improve a signal-to-noise-ratio (SNR). Therefore, a main input containing a corrupted signal and a reference input containing noise correlated in some unknown way with the primary noise are used. This reference input is adaptively filtered and subtracted from the main input to obtain the signal estimate. Adaptive filtering before subtraction allows the treatment of inputs that are deterministic or stochastic, stationary or time variable. Wiener solutions are developed to describe asymptotic adaptive performance and output SNR for stationary stochastic inputs, including single and multiple reference inputs. These solutions show that, when the reference input is free of signal and certain other conditions are met, noise in the main input can be essentially eliminated without signal distortion. In this case, the canceler behaves as a linear, time-invariant system, with the adaptive filter converging on a dynamic rather than a static solution.

A kind of adaptive noise canceler with adaptive cross-talk filters can be found in some articles and patents. [1] is used as a basis for improvement to eliminate cross-talk between voice and noise signals from a main input and a reference input (see [2], [3] and [4] for further details).

In [5] a different configuration of a cross-talk adaptive noise canceler is developed by splitting the adaptive cross-talk filter into a pre-filter section and an adaptive filter section.

Document [6] discloses a noise canceler utilizing four adaptive filters and a signal-to-noise power ratio estimator to do cross-talk noise cancellation. Furthermore, adjustment of the step sizes of the two main adaptive cross-talk filters is provided to incorporate a better tracking ability while the wanted voice signal does not exist. On the other hand, a smaller residual noise is achieved while the wanted voice signal is present.

FIG. 1 shows a noise canceler as disclosed in [6]. This noise canceler includes a main input 1 (first microphone) to obtain a main signal x1(*n*), a reference input 2 (second microphone) to obtain a reference signal x2(*n*), a signal output 5, adaptive filters 3 and 6, adders 4 and 7, delay circuits 8 and 9, a signal-to-noise power ratio estimator 10 and a step size output circuit 11. The signal-to-noise power ratio estimator 10 is made up of adaptive filters 12 and 13, adders 14 and 15, power mean circuits 16, 17, 18 and 19, and Dividers 20 and 21.

The main signal x1(*n*) is delayed by the delay circuit 8 by D samples to turn out a delayed main signal. This delayed main signal is applied to the subtracter 4. On the other hand, the reference signal x2(*n*) is delayed by the delay circuit 9 by D samples to turn out a delayed reference signal that is applied to the subtracter 7. The adaptive filter 3 operates to estimate a noise signal included in the main signal x1(*n*) while the adaptive filter 6 operates to estimate a desired signal included in the reference signal x2(*n*). To allow the filter 3 to estimate the noise signal y1(*n*), the desired signal y2(*n*) estimated by filter 6 is subtracted from the reference signal x2(*n*) by the subtracter 7, and the resulting noise signal e2(*n*) is input to the filter 3. Likewise, the noise signal y1(*n*) estimated by the filter 3 is subtracted from the main signal x1(*n*), and the resulting desired signal e1(*n*) is input to filter 6. For this purpose, the two filters 3 and 6 are cross-coupled, as illustrated.

Now, for the adaptive filter 3 to estimate the noise signal y1(*n*) in the main signal accurately, it is necessary to increase the amount of updating of the filter coefficient when the desired signal of the main signal obstructing the estimation is smaller than the noise signal to be estimated. Conversely, when the desired signal of the main signal is greater than the noise signal, it is necessary to reduce the above amount because the signal obstructing the estimation is greater than the noise signal.

On the other hand, for the adaptive filter 6 to estimate the desired signal of the reference signal accurately, it is necessary to increase the amount of updating of the filter coefficient when the noise signal contained in the reference signal obstructing the estimation is smaller than the desired signal. Conversely, when the noise signal of the reference signal is greater than the desired signal, it is necessary to reduce the above amount because the signal obstructing the estimation is greater than the desired signal.

The coefficient for each adaptive filter can be controlled to meet the above requirement by controlling the step size of the adaptive filters.

It is a significant disadvantage of the system disclosed in [6] that the noise canceler as shown in FIG. 1 comprises a signal-to-noise power ratio estimator 10 with two additional adaptive filters 12 and 13. The computations of the noise canceler are increased due to these filters 12 and 13. Moreover, the adaptive filters 12 and 13 embody fixed step sizes affecting an inflexible voice and noise estimation.

SUMMARY OF THE INVENTION

It is an object of the present invention to provide an acoustic noise canceler to be able to achieve a good noise cancellation with reduced computational effort.

Furthermore, it is an object of the invention to provide a noise suppression system and an accompanying method.

More specifically, it is an object of the invention to provide an adaptive cross-talk noise canceler which comprises two cross-coupled adaptive filters with adjustable step sizes for updating the coefficients of the filters.

Other objects, features and advantages according to the present invention will be presented in the following detailed description of the illustrated embodiments when read in conjunction with the accompanying drawings.

These objects of the present invention are achieved by the features of the independent claims. Additional features result from the dependent claims.

A noise canceler of the present invention is composed of a main signal input, a reference signal input, a signal output, a voice detection circuitry, a step decision circuitry and two adaptive filters.

The main input receives a main signal which is a voice signal (speech signal) contaminated by noise. The reference input receives a reference signal which is a noise intermingled by cross-talk voice signal (speech signal). The signal output sends out the voice signal with suppressed noise. Further processing might be provided as an automatic voice recognition system. Alternatively, the human listener is the recipient of the noise suppressed voice signal.

The Voice Detection Circuitry detects whether or not voice signal is present. A measurement regarding to the voice signal is obtained based on a certain criterion (either power mean or cross-correlation). The presence of voice can be measured as a comparison of the value of that measurement with a predefined threshold value. Then the comparison results are used to determine the presence of the voice signal. The mechanism about the measurement and comparison will be described in detail latter.

The Step Size Decision Circuitry decides about the size of the steps that should be used for the next update of the two adaptive filters. The first adaptive filter 3 estimates the noise which is used to cancel the noise contained in the main signal. The second adaptive filter 6 estimates the voice signal which is used to remove the voice signal contained in the reference signal.

It is another embodiment of the present invention that the described system is a transceiver.

It is yet another embodiment of the present invention to provide a method for noise suppression to be executed on any of the above described systems.

BRIEF DESCRIPTION OF THE DRAWINGS

Examples of the present invention will be described in detail in view of the following drawings.

DETAILED DESCRIPTION OF THE DRAWINGS

Figure 1:
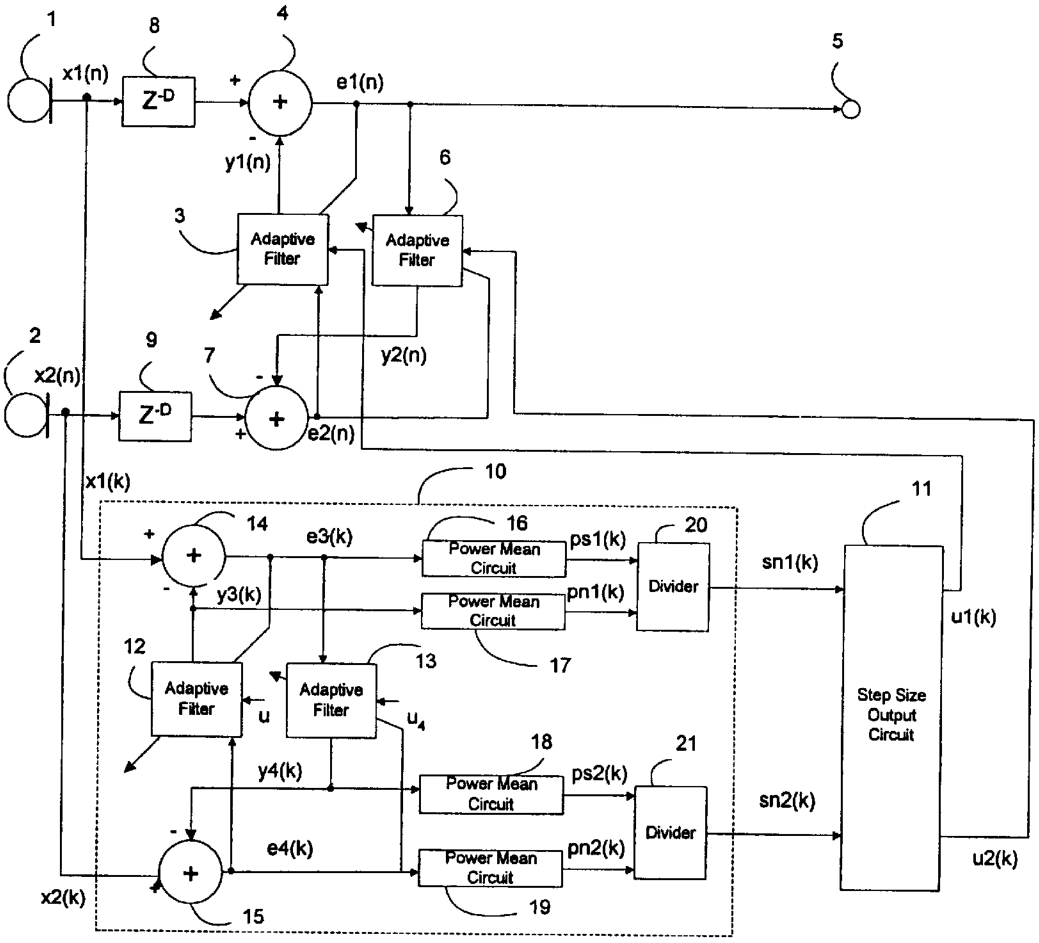
FIG. 1 shows a block diagram of the a noise canceler (prior art)
Figure 2:
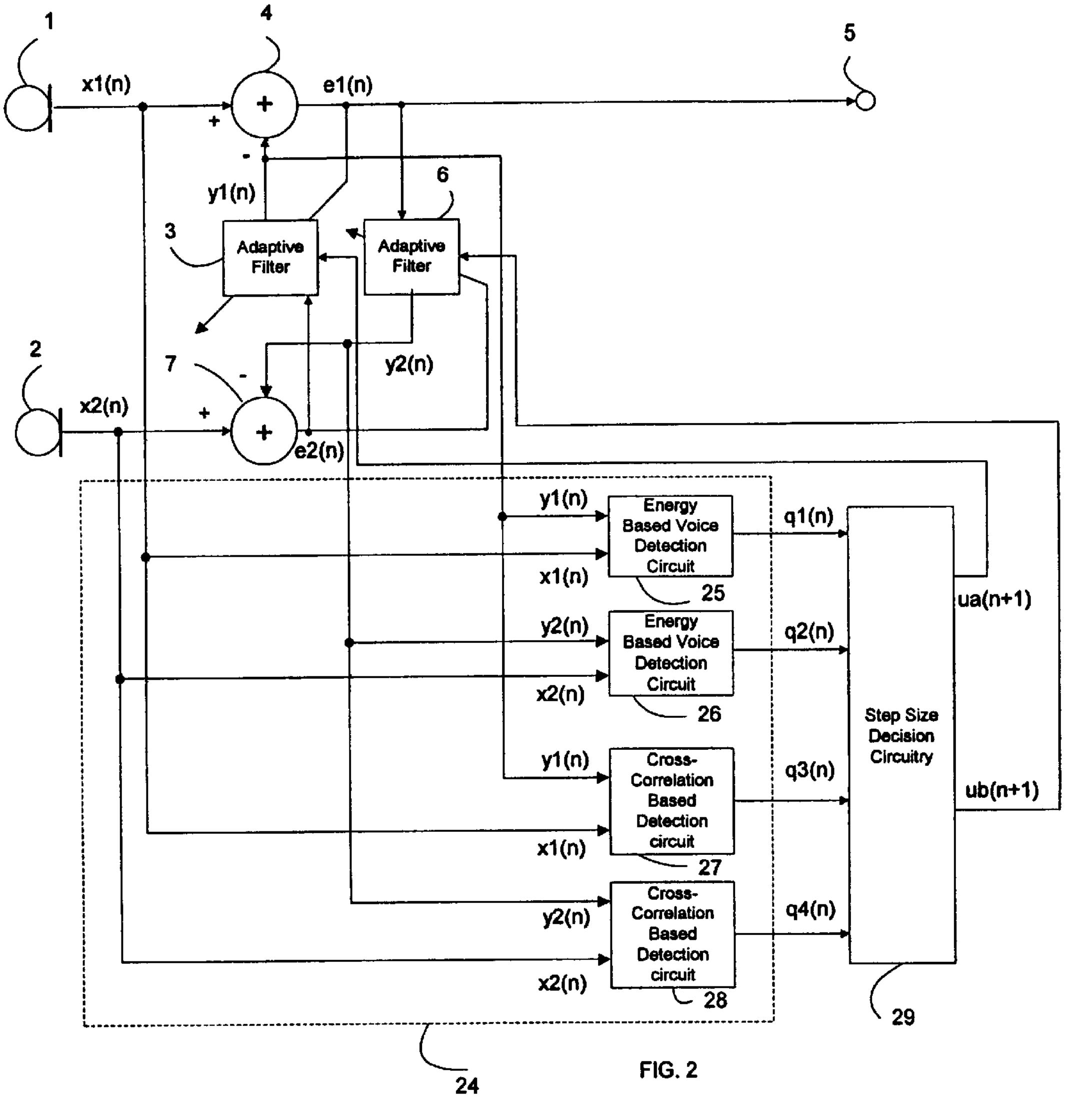
FIG. 2 illustrates a system for noise suppression.

FIG. 2 illustrates a block diagram of a system for noise suppression (hereafter referred to as a noise canceler) of the present invention. The noise canceler includes a main input 1 (first microphone), a reference input 2 (second microphone), a signal output 5, adaptive filters 3 and 6, adders 4 and 7, a Voice Detection Circuitry 24 and a Step Size Decision Circuitry 29. It has to be noted that "macro-units" such as the Voice Detection Circuitry 24 or the Step Size circuitry 29 need not to be formed as separate circuits. Each macro-unit is provided to logically separate functional circuits for the purpose of clarity.

A main signal x1(*n*) is applied to the adder 4, and a reference signal x2(*n*) is applied to the adder 7.

The adaptive filter 3 is used to estimate a first noise signal y1(*n*) included in the main signal x1(*n*) while the adaptive filter 6 is used to estimate a cross-talked voice signal (=filtered voice signal) y2(*n*) included in the reference signal x2(*n*). The adder 4 subtracts the first noise signal y1(*n*) of the adaptive filter 3 from the main signal x1(*n*) to get a noise suppressed voice signal e1(*n*). The adder 7 subtracts the output signal y2(*n*) of the adaptive filter 6 from the reference signal x2(*n*) to obtain a second noise signal e2(*n*).

The adaptive filter 3 uses the second noise signal e2(*n*) as its reference, the noise suppressed signal e1(*n*) as its error signal and a signal ua(n) as its step size to update its coefficients.

Similarly, the adaptive filter 6 uses the noise suppressed signal e1(*n*) as its reference, the second noise signal e2(*n*) as its error signal and a signal ub(n) as its step size to update its coefficients.

The signal ua(n) and the signal ub(n) are generated by the Step Size Decision Circuitry 29 that will be explained further below.

The two adaptive filters 3 and 6 are cross-coupled, as shown in FIG. 2. After the adaptive filters 3 and 6 converge, the adaptive filter 3 can estimate the first noise signal y1(*n*) contained in the main signal x1(*n*) accurately and the adaptive filter 6 can estimate the filtered voice signal y2(*n*) in the reference signal x2(*n*) accurately. As a result, the signal e1(*n*) is the voice signal with suppressed noise and embodies the output of the noise canceler.

If there is no control of the update step sizes ua(n) and ub(n), the existence of voice signal will affect the performance of the system. Conceptually, it is necessary for the adaptive filter 3 to increase its step size when the voice signal does not exist. Conversely, when the voice signal is present, it is necessary for the adaptive filter 3 to reduce its step size. On the other hand, the operation for adaptive filter 6 is just the opposite. It needs to increase its step size when the voice signal exists. Conversely, when the voice signal is not present, it is necessary to reduce its step size. To achieve this, the Voice Detection Circuitry 24 and a the Step Size Decision Circuitry 29 provide the step sizes ua(n+1) and ub(n+1) for the next updates of the two adaptive filters 3 and 6, respectively. The Voice Detection Circuitry 24 comprises energy based voice detection circuits 25 and 26, and cross-correlation based voice detection circuits 27 and 28 as described in detail below.

Figure 3:
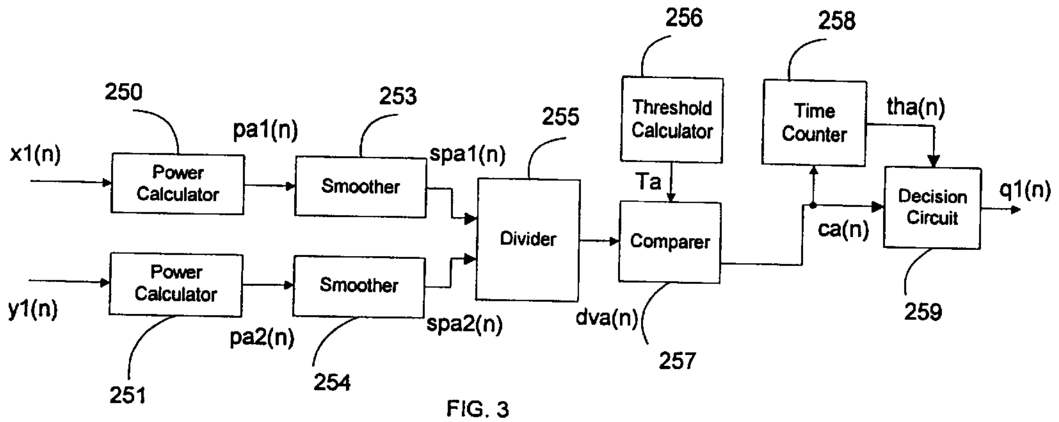
FIG. 3 illustrates a first energy based voice detection circuit.

FIG. 3 shows the energy based voice detection circuit 25 for the main signal comprising Power Calculators 250 and 251, Smoothers 253 and 254, a Divider 255, a Threshold Calculator 256, a Comparer 257, a Time Counter 258 and a Decision Circuit 259.

The Power Calculators 250 and 251 receive the main signal x1(*n*) and the first noise signal y1(*n*) from the adaptive filter 3, respectively, and output the power signals pa1(*n*) and pa2(*n*), respectively. The power signals pa1(*n*) and pa2(*n*) are sent to the Smoothers 253 and 254, respectively, to output smoothed power signals spa1($n$) and spa2($n$). The Divider 255 receives the signals spa1($n$) and spa2($n$), respectively, and divides spa1($n$) by spa2($n$) to obtain a quotient signal dva(n). This quotient signal dva(n) is compared with a threshold Ta from the Threshold Calculator 256 at the Comparer 257. The Comparer 257 evaluates a comparison result ca(n):

ca(n)=0 for dva(n)<Ta, i.e. voice signal is not present;

ca(n)=1 for dva(n)≧Ta, i.e. voice signal exists.

The Time Counter 258 detects whether the value (0 or 1) of the comparison result ca(n) is kept unchanged consecutively over a certain period T of time and outputs a signal tha(n):

tha(n)=0 for ca(n) is changed during period T;

tha(n)=1 for ca(n) is kept unchanged during period T.

The Decision Circuit 259 uses the signal tha(n) from the Time Counter 258 and the comparison result ca(n) from the Comparer 257 to evaluate the first decision signal q1($n$) to be input to the Step Size Decision Circuitry 29. The values of this first decision signal q1($n$) are as follows:

q1($n$)=0 (i.e. voice signal is not present)

q1($n$)=1 (i.e. voice signal exists)

The operation of the Decision Circuit 259 is described in Equation (1), i.e., $$q1(n-1),\ \text{if}\ tha(n)=0;$$
$$q1(n)=1,\ \text{if}\ tha(n)=1\ \text{and}\ ca(n)=1;$$
$$0,\ \text{if}\ tha(n)=1\ \text{and}\ ca(n)=0. \quad (1)$$

Figure 4:
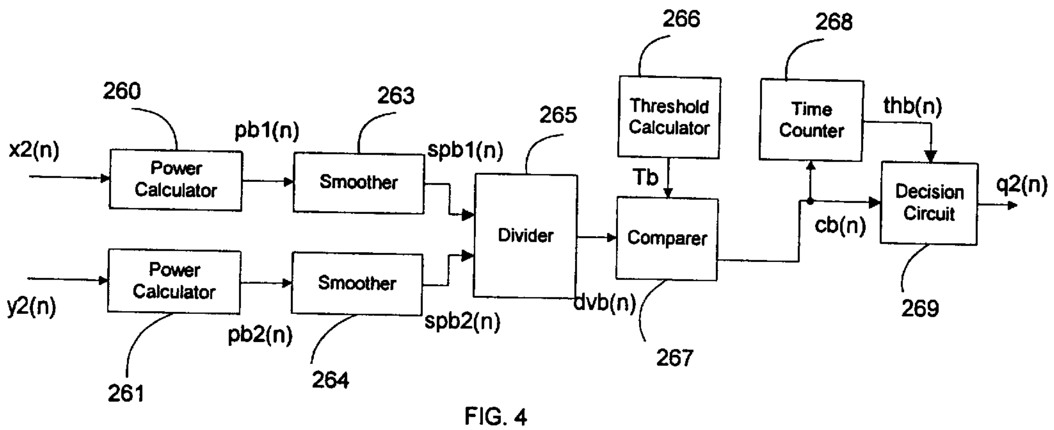
FIG. 4 illustrates a second energy based voice detection circuit.

Similarly, as shown in FIG. 4, the energy based voice detection circuit 26 for the reference signal x2($n$) consists of Power Calculators 260 and 261, Smoothers 263 and 264, a Divider 265, a Threshold Calculator 266, a Comparer 267, a Time Counter 268 and a Decision Circuit 269.

The Power Calculators 260 and 261 receive the reference signal x2($n$) and the filtered voice signal y2($n$) from the adaptive filter 6, respectively, and output the power signals pb1($n$) and pb2($n$), respectively. The power signals pb1($n$) and pb2($n$) are sent to the Smoothers 263 and 264, respectively, to output the smoothed power signals spb1($n$) and spb2($n$). The Divider 265 receives the signals spb1($n$) and spb2($n$), respectively, and divides spb1($n$) by spb2($n$) to obtain a quotient signal dvb(n). This quotient signal dvb(n) is compared with a threshold Tb from the Threshold Calculator 266 at the Comparer 267. The Comparer 267 evaluates a comparison result cb(n):

cb(n)=0 for dvb(n)<Tb, i.e. voice signal exists;

cn(n)=1 for dvb(n)≧Tb, i.e. voice signal is not present.

The Time Counter 268 detects whether the value (0 or 1) of the comparison result cb(n) is kept unchanged consecutively over a certain period T of time and outputs a signal thb(n):

thb(n)=0 for cb(n) is changed during period T;

thb(n)=1 for cb(n) is kept unchanged during period T.

The Decision Circuit 269 uses the signal thb(n) from the Time Counter 268 and the comparison result cb(n) from the Comparer 267 to evaluate the second decision signal q2($n$) to be input to the Step Size Decision Circuitry 29. The values of this second decision signal q2($n$) are as follows:

q2($n$)=0 (i.e. voice signal is not present)

q2($n$)=1 (i.e. voice signal exists)

The operation of the Decision Circuit 269 is described in Equation (2), i.e., $$q2(n-1),\ \text{if}\ thb(n)=0;$$
$$q2(n)=1,\ \text{if}\ thb(n)=1\ \text{and}\ cb(n)=0;$$
$$0,\ \text{if}\ thb(n)=1\ \text{and}\ cb(n)=1. \quad (2)$$

Please note that q2($n$)=1 if cb(n)=0 and q2($n$)=0 if cb(n)=1 under the condition of thb(n)=1. This is different from Equation (1).

Figure 5:
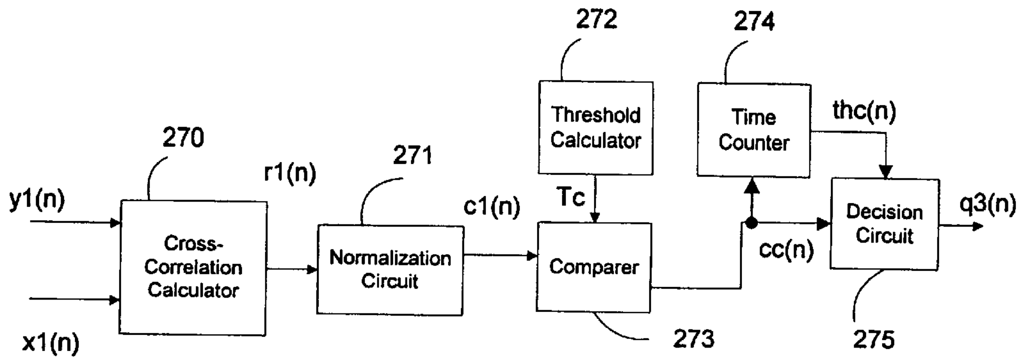
FIG. 5 illustrates a first cross-correlation based voice detection circuit.

FIG. 5 illustrates the cross-correlation based voice detection circuit 27 for the main signal x1($n$) comprising a Cross-Correlation Calculator 270, a Normalization Circuit 271, a Threshold Calculator 272, a Comparer 273, a Time Counter 274 and a Decision Circuit 275.

The Cross-Correlation Calculator 270 receives the main signal x1($n$) and the output signal y1($n$) from the adaptive filter 3, and computes their cross-correlation r1($n$). The signal r1($n$) is input to the Normalization Circuit 271 to do normalization and hence obtain a normalized signal c1($n$). This signal c1($n$) is sent to the Comparer 273 to be compared with a threshold Tc from the Threshold Calculator 272. The Comparer 272 outputs a comparison result cc(n):

cc(n)=0 for c1($n$)<Tc, i.e. voice signal does not exist;

cc(n)=1 for c1($n$)≧Tc, i.e. voice signal is present.

The Time Counter 274 detects whether the value (0 or 1) of the comparison result cc(n) is kept unchanged consecutively over a certain period T of time and outputs a signal thc(n):

thc(n)=0 for cc(n) is changed during period T;

thc(n)=1 for cc(n) is kept unchanged during period T.

The Decision Circuit 275 uses the signal thc(n) from the Time Counter 274 and the comparison result cc(n) from the Comparer 273 to evaluate the third decision signal q3($n$) to be input for the Step Size Decision Circuitry 29. The values of this third decision signal are as follows:

q3($n$)=0 (i.e. voice signal is not present);

q3($n$)=1 (i.e. voice signal exists).

The operation of the Decision Circuit 273 is described in Equation (3), i.e., $$q3(n-1),\ \text{if}\ thc(n)=0;$$
$$q3(n)=1,\ \text{if}\ thc(n)=1\ \text{and}\ cc(n)=1;$$
$$0,\ \text{if}\ thc(n)=1\ \text{and}\ cc(n)=0. \quad (3)$$

Figure 6:
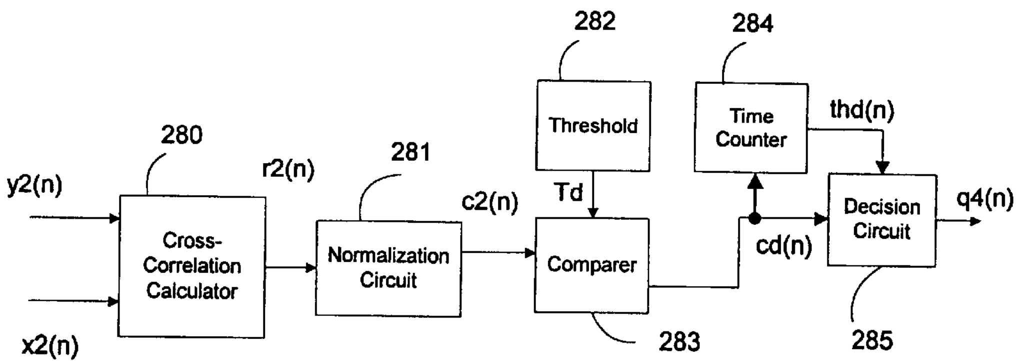
FIG. 6 illustrates a second cross-correlation based voice detection circuit.

Similarly, FIG. 6 shows the cross-correlation based voice detection circuit 28 for the reference signal x2($n$) comprising a Cross-Correlation Calculator 280, a Normalization Circuit 281, a Threshold Calculator 282, a Comparer 283, a Time Counter 284 and a Decision Circuit 285. The Cross-Correlation Calculator 280 receives the reference signal x2($n$) and the filtered voice signal y2($n$) from the adaptive filter 6 and computes their cross-correlation r2($n$). The signal r2($n$) is input to the Normalization Circuit 281 to do normalization and hence obtain a normalized signal c2($n$). This signal c2($n$) is sent to the Comparer 283 to be compared with a threshold Td from the Threshold Calculator 282. The Comparer 282 outputs a comparison result cd(n):

cd(n)=0 for c2(n)<Td, i.e. voice signal exists;

cd(n)=1 for c2(n)≧Td, i.e. voice signal is not present.

The Time Counter 284 detects whether the value (0 or 1) of the comparison result cd(n) is kept unchanged consecutively over a certain period T of time and outputs a signal thd(n):

thc(n)=0 for cd(n) is changed during the period T;

thc(n)=1 for cd(n) is kept unchanged during the period T.

The Decision Circuit 285 uses the signal thd(n) from the Time Counter 284 and the comparison result cd(n) from the Comparer 283 to evaluate the forth decision signal q4(*n*) to be input for the Step Size Decision Circuitry 29. The values of this forth decision signal q4(*n*) are as follows:

q4(*n*)=0 (i.e. voice signal is not present);

q4(*n*)=1 (i.e. voice signal exists).

The operation of the Decision Circuit 283 is described in Equation (4), i.e., $$q4(n-1),\ \text{if } thd(n)=0;$$
$$q4(n)=1,\ \text{if } thd(n)=1 \text{ and } cd(n)=0;$$
$$0,\ \text{if } thd(n)=1 \text{ and } cd(n)=1. \quad (4)$$

Please note that q4(*n*)=1 if cd(n)=0 and q4(*n*)=0 if cd(n)=1 under the condition of thd(n)=1. This is different from Equation (4).

Figure 7:
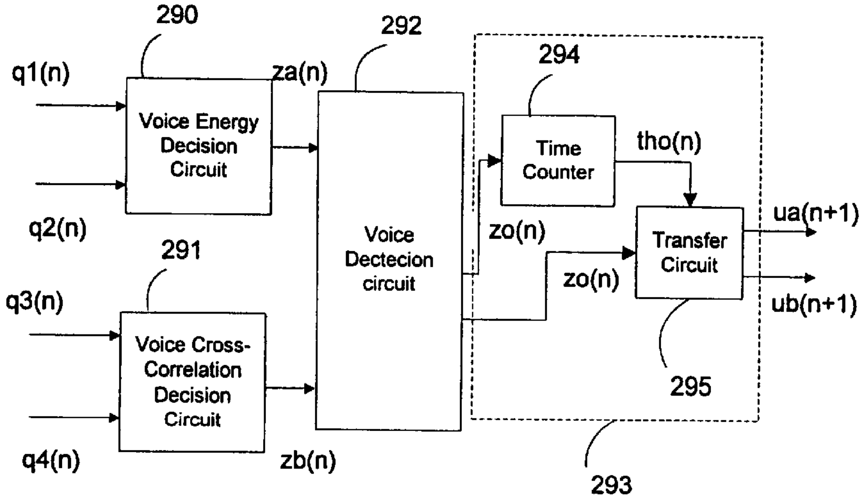
FIG. 7 illustrates a Step Size Decision Circuitry.

FIG. 7 shows the Step Size Decision Circuit 29 comprising a Voice Energy Decision Circuit 290, a Voice Cross-Correlation Decision Circuit 291, a Voice Detection Circuit 292 and a Step Size Output Circuit 293.

The Voice Energy Decision Circuit 290 receives the first decision signal q1(*n*) and the second decision signal q2(*n*) to evaluate the voice detection result based on energy and outputs a decision signal za(n) which has three possible values {0, 1, 2}. The decision of the Voice Energy Decision Circuit 290 is described in Equation (5), i.e., $$za(n) = \begin{cases} 0, & \text{if } q1(n) = 0 \text{ and } q2(n) = 0; \\ 1, & \text{if } q1(n) = 1 \text{ or } q2(n) = 1; \\ 2, & \text{if } q1(n) = 1 \text{ and } q2(n) = 1. \end{cases} \quad (5)$$

Likewise, the Voice Cross-Correlation Decision Circuit 291 receives the third decision signal q3(*n*) and the forth decision signal q4(*n*) to evaluate the voice detection result based on cross-correlation and outputs a decision signal zb(n) which has three possible values {0, 1, 2}. The decision of the Voice Cross-Correlation Decision Circuit 291 is described in Equation (6), i.e., $$zb(n) = \begin{cases} 0, & \text{if } q3(n) = 0 \text{ and } q4(n) = 0; \\ 1, & \text{if } q3(n) = 1 \text{ or } q4(n) = 1; \\ 2, & \text{if } q3(n) = 1 \text{ and } q4(n) = 1. \end{cases} \quad (6)$$

The Voice Detection Circuit 292 receives the decision signals za(n) and zb(n) to make the final decision of voice existence and outputs a decision signal zo(n) which has six possible values {0, 1, 2, 3, 4, 5}. The decision of the Voice Detection Circuit 292 is described in Equation (7), i.e., $$zo(n) = \begin{cases} 0, & \text{if } za(n) = 0 \text{ and } zb(n) = 0; \\ 1, & \text{if } za(n) = 1 \text{ and } zb(n) = 0, \text{ or } za(n) = 0 \text{ and } zb(n) = 1; \\ 2, & \text{if } za(n) = 1 \text{ and } zb(n) = 1; \\ 3, & \text{if } za(n) = 2 \text{ and } zb(n) = 0, \text{ or } za(n) = 0 \text{ and } zb(n) = 2; \\ 4, & \text{if } za(n) = 2 \text{ and } zb(n) = 1, \text{ or } za(n) = 1 \text{ and } zb(n) = 2; \\ 5, & \text{if } za(n) = 2 \text{ and } zb(n) = 2. \end{cases} \quad (7)$$

The Step Size Output Circuit 293 receives the signal zo(n) and outputs the step sizes ua(n+1) and ub(n+1) for the next updates of the two adaptive filters 3 and 6, respectively. There are six values for each step size, i.e., $$ua0>ua1>ua2>ua3>ua4>ua5 \text{ for } ua(n+1) \quad (8)$$

and $$ub0>ub1>ub2>ub3>ub4>ub5 \text{ for } ub(n+1). \quad (9)$$

The signal zo(n) is input to a Time Counter 294 which detects whether the value of zo(n) is kept unchanged consecutively over a certain period Tp of time and hence outputs a signal tho(n):

tho(n)=0 for zo(n) is changed during period Tp;

tho(n)=1 for zo(n) is kept unchanged during period Tp.

A Transfer Circuit 295 receives the signal tho(n) from the Time Counter 294 and the output signal zo(n) from the Voice Detection Circuit 292 and outputs two step sizes ua(n+1) and ub(n+1). The operation of the Transfer Circuit 295 is described hereafter. If the signal tho(n) equals 0, no matter what the value of signal zo(n) is, the step sizes ua(n+1) and ub(n+1) keep the previous values, i.e.

$$za(n+1)=za(n),$$
$$\text{if } tho(n)=0;$$

and $$zb(n+1)=zb(n),$$
$$\text{if } tho(n)=0;$$

Otherwise, if the signal tho(n) equals 1, the step sizes ua(n+1) and ub(n+1) are selected as shown in the following table:

| zo(n) | ua(n + 1) | ub(n + 1) |
|---|---|---|
| 0 | ua5 | ub0 |
| 1 | ua4 | ub1 |
| 2 | ua3 | ub2 |
| 3 | ua2 | ub3 |
| 4 | ua1 | ub4 |
| 5 | ua0 | ub5 |

The output step sizes ua(n+1) and ub(n+1) are used to update the adaptive filters 3 and 6, respectively, at the next sample.

BIBLIOGRAPHY

[1] Widrow et al.: "Adaptive Noise Cancelling: Principles and Applications"; Proc. of IEEE, Vol.63, No.12, December 1975, pp.1692–1719.

[2] Zinser et al.: "Some Experimental and Theoretical Results Using a new Adaptive Filter Structure for Noise Cancellation in the Presence of Crosstalk", Proc. of IEEE Intern. Conference on Acoustics, Speech and Signal Processing, Tampa, Fla., 1985, pp.32.6.1–4.

[3] Michandani et al.: "Performance Characteristics of a Hardware Implementation of the Cross-Talk Resistant Adaptive Noise Canceler", Proc. of IEEE Intern. Converence on Acoustics, Speech and Signal Processing, Tokyo, Japan, 1986, pp.93–96.

[4] U.S. Pat. No. 4,649,505 Zinser, Jr. et al.: "Two-Input Crosstalk-Resistant Adaptive Noise Canceler".

[5] U.S. Pat. No. 5,740,256 Da Costa et al.: "Adaptive Noise Cancelling Arrangement, a Noise Reduction System and a Transceiver".

[6] U.S. Pat. No. 5,978,824 Ikeda: "Noise Canceler".

What is claimed is:

1. A system for noise suppression, comprising:

a) a main input (1) for receiving a main signal (x1(*n*)) which is a voice signal contaminated by noise;

b) a reference input (2) for receiving a reference signal (x2(*n*)) which is a noise signal intermingled with voice by cross-talking;

c) a signal output (5) for providing a noise suppressed signal (e1(*n*));

d) a first calculation unit (4) for evaluating the noise suppressed signal (e1(*n*)) from the main signal (x1(*n*)) and a first noise signal (y1(*n*));

e) a second calculation unit (7) for evaluating a second noise signal (e2(*n*)) from the reference signal (x2(*n*)) and a filtered voice signal (y2(*n*));

f) a first adaptive filter (3), receiving the second noise signal (e2(*n*)) and adaptively estimating a part of noise within the main signal (x1(*n*)) to thereby output the first noise signal (y1(*n*));

g) a second adaptive filter (6), receiving the noise suppressed signal (e1(*n*)) and adaptively estimating a part of voice within the reference signal (x2(*n*)) to thereby output the filtered voice signal (y2(*n*));

h) a Voice Detection Circuitry (24), comprising:

(1) a first energy based voice detection circuit (25), receiving the output signal (y1(*n*)) of the first adaptive filter (3) and the main signal (x1(*n*)) and emitting a first decision signal (q1(*n*)) that indicates whether or not voice is detected;

(2) a second energy based voice detection circuit (26), receiving the output signal (y2(*n*)) of the second adaptive filter (6) and the reference signal (x2(*n*)) and emitting a second decision signal (q2(*n*)) that indicates whether or not voice is detected;

(3) a first cross-correlation based voice detection circuit (27), receiving the output signal (y1(*n*)) of the first adaptive filter (3) and the main signal (x1(*n*)) and emitting a third decision signal (q3(*n*)) that indicates whether or not voice is detected;

(4) a second cross-correlation based voice detection circuit (28), receiving the output signal (y2(*n*)) of the second adaptive filter (6) and the reference signal (x2(*n*)) and emitting a forth decision signal (q4(*n*)) that indicates whether or not voice is detected;

i) a Step Size Decision Circuitry (29), receiving the decision signals (q1(*n*), q2(*n*), q3(*n*), q4(*n*)) from the energy based voice detection circuits (25, 26) and the cross-correlation based voice detection circuits (27, 28) to thereby output step sizes (ua(n+1), ub(n+1)) for the first adaptive filter (3) and the second adaptive filter (6).

2. System as defined in claim 1, wherein said first calculation unit is an adder for subtracting the first noise signal (y1(*n*)) from the main signal (x1(*n*)).

3. System as defined in claim 1, wherein said second calculation unit is an adder for subtracting the filtered voice signal (y2(n)) from the reference signal (x2(n)).

4. System as defined in claim 1, wherein at least one of said decision signals (q1(n), q2(n), q3(n), q4(n)) indicates the presence of voice, if the comparison result showing so.

5. System as defined in claim 1, said first energy based voice detection circuit (25) comprising:

a) first Power Calculators (250, 251), receiving the input signals (x1(n), y1(n)) of the first energy based voice detection circuit (25) and evaluating first output signals (pa1(n), pa2(n));

b) first Smoothers (253, 254), receiving the first output signals and evaluating smoothed f second output signals (spa1(n), spa2(n));

c) a first Divider (255), receiving the second output signals (spa1(n), spa2(n)), dividing them obtaining a third output signal (dva(n));

d) a first Comparer (257), receiving the third output signal (dva(n)) in order to compare it with a first threshold value (Ta), provided from a first Threshold Calculator (256) obtaining a forth output signal (ca(n)) that indicates whether or not voice is present;

e) a first Time Counter (258), receiving the forth output signal (ca(n)) from the first Comparer (257) to evaluate a fifth output signal (tha(n)), dependent upon whether or not the forth output signal (ca(n)) changes within a predefined time period;

f) a first Decision Circuit (259), receiving the forth output signal (ca(n)) from the first Comparer (257) and the fifth output signal (tha(n)) from the first Time Counter (258) to evaluate the first decision signal (q1(n)) for the Step Size Decision Circuitry (29).

6. System as defined in claim 1, said second energy based voice detection circuit (26) comprising:

a) second Power Calculators (260, 261), receiving the input signals (x2(n), y2(n)) of the second energy based voice detection circuit (26) and evaluating sixth output signals (pb1(n), pb2(n));

b) second Smoothers (263, 264), receiving the sixth output signals and evaluating smoothed seventh output signals (spb1(n), spb2(n));

c) a second Divider (265), receiving the seventh output signals (spb1(n), spb2(n)), dividing them obtaining a eighth output signal (dvb(n));

d) a second Comparer (267), receiving the eighth output signal (dvb(n)) in order to compare it with a second threshold value (Tb) provided from a second Threshold Calculator (266) obtaining a ninth output signal (cb(n)) that indicates whether or not voice is present;

e) a second Time Counter (268), receiving the ninth output signal (cb(n)) from the second Comparer (267) to evaluate a tenth output signal (thb(n)), dependent upon whether or not the ninth output signal (cb(n)) changes within a predefined time period;

f) a second Decision Circuit (269), receiving the ninth output signal (cb(n)) from the second Comparer (267) and the tenth output signal (thb(n)) from the second Time Counter (268) to evaluate the second decision signal (q2(n)) for the Step Size Decision Circuitry (29).

7. System as defined in claim 1, said first cross-correlation based voice detection circuit (27) comprising:

a) a first Cross-Correlation Calculator (270), receiving the input signals (x1(n), y1(n)) of the first crosscorrelation based voice detection circuit (27) and evaluating an cross-correlated eleventh output signal (r1(n));

b) a first Normalization Circuit (271), receiving the eleventh output signal (r1(n)) doing normalization and evaluating a twelfth output signal (c1(n));

c) a third Comparer (273), receiving the twelfth output signal (c1(n)) to do a comparison with a third threshold value (Tc) from a third Threshold Calculator (272) obtaining a thirteenth output signal (cc(n)) that indicates whether or not voice is present;

d) a third Time Counter (274), receiving the thirteenth output signal (cc(n)) from the third Comparer (273) to evaluate a fourteenth output signal (thc(n)), dependent upon whether or not the thirteenth output signal (cc(n)) changes within a predefined time period;

e) a third Decision Circuit (275), receiving the thirteenth output signal (cc(n)) from the third Comparer (273) and the fourteenth output signal (thc(n)) from the third Time Counter (274) to evaluate the third decision signal (q3(n)) for the Step Size Decision Circuitry (29).

8. System as defined in claim 1, said first cross-correlation based voice detection circuit (28) comprising:

a) a second Cross-Correlation Calculator (280), receiving the input signals (x2(n), y2(n)) of the second cross-correlation based voice detection circuit (27) and evaluating a cross-correlated fifteenth output signal (r2 (n));

b) a second Normalization Circuit (281), receiving the fifteenth output signal (r2(n)) doing normalization and evaluating a sixteenth output signal (c2(n));

c) a forth Comparer (283), receiving the sixteenth output signal (c2(n)) to do a comparison with a forth threshold value (Td) from a forth Threshold Calculator (282) obtaining a seventeenth output signal (cd(n)) that indicates whether or not voice is present;

d) a forth Time Counter (284), receiving the seventeenth output signal (cd(n)) from the forth Comparer (283) to evaluate an eighteenth output signal (thd(n)),dependent upon whether or not the seventeenth output signal (cd(n)) changes within a predefined time period;

e) a forth Decision Circuit (285), receiving the seventeenth output signal (cd(n)) from the forth Comparer and the eighteenth output signal (thd(n)) from the forth Time Counter (284) to evaluate the forth decision signal (q4(n)) for the Step Size Decision Circuitry (29).

9. System as defined in claim 1, said voice detection circuit (28) comprising:

a) a Voice Energy Decision Circuit (290), receiving the first decision signal (q1(n)) and the second decision signal (q2(n)) and evaluating a first voice decision signal (za(n)) based on the energy of the voice;

b) a Voice Cross-Correlation Decision Circuit (291), receiving the third decision signal (q3(n)) and the forth decision signal (q4(n)) and evaluating a crosscorrelated second voice decision signal (zb(n)) based on cross-correlation;

c) a Voice Detection Circuit (292), receiving the first voice decision signal (za(n)) and the second voice decision signal (zb(n)) to make a further decision of voice presence and evaluating a nineteenth output signal (zo(n));

d) a Step Size Output Circuit (293), receiving the nineteenth output signal (zo(n)) of the Voice Detection Circuit (292) and outputs the step sizes (ua(n+1)), ub(n+1) for the next updates of the first adaptive filter (3) and the second adaptive filter (6), respectively.

10. System as defined in claim 9, said Step Size Output Circuit (293) comprising:

a) a fifth Time Counter (294), receiving the nineteenth output signal (zo(n)) of the Voice Detection Circuit (292) to evaluate a twentieth output signal (tho(n)), dependent upon whether or not the nineteenth output signal (zo(n)) is kept unchanged for a predefined period of time;

b) a Transfer Circuit (295), receiving the twentieth output signal (tho(n)) of the fifth Time Counter (294) and the nineteenth output signal (zo(n)) of the Voice Detection Circuit (292) to evaluate said step sizes (ua(n+1), ub(n+1)) for the first adaptive filter (3) and the second adaptive filter (6).

11. System as defined in claim 1, wherein said system is a transceiver.

12. Method for noise suppression of a main signal (x1(n)) which is a voice signal contaminated by noise to be executed on a system as defined in claim 1.

* * * * *